Patented Jan. 23, 1951

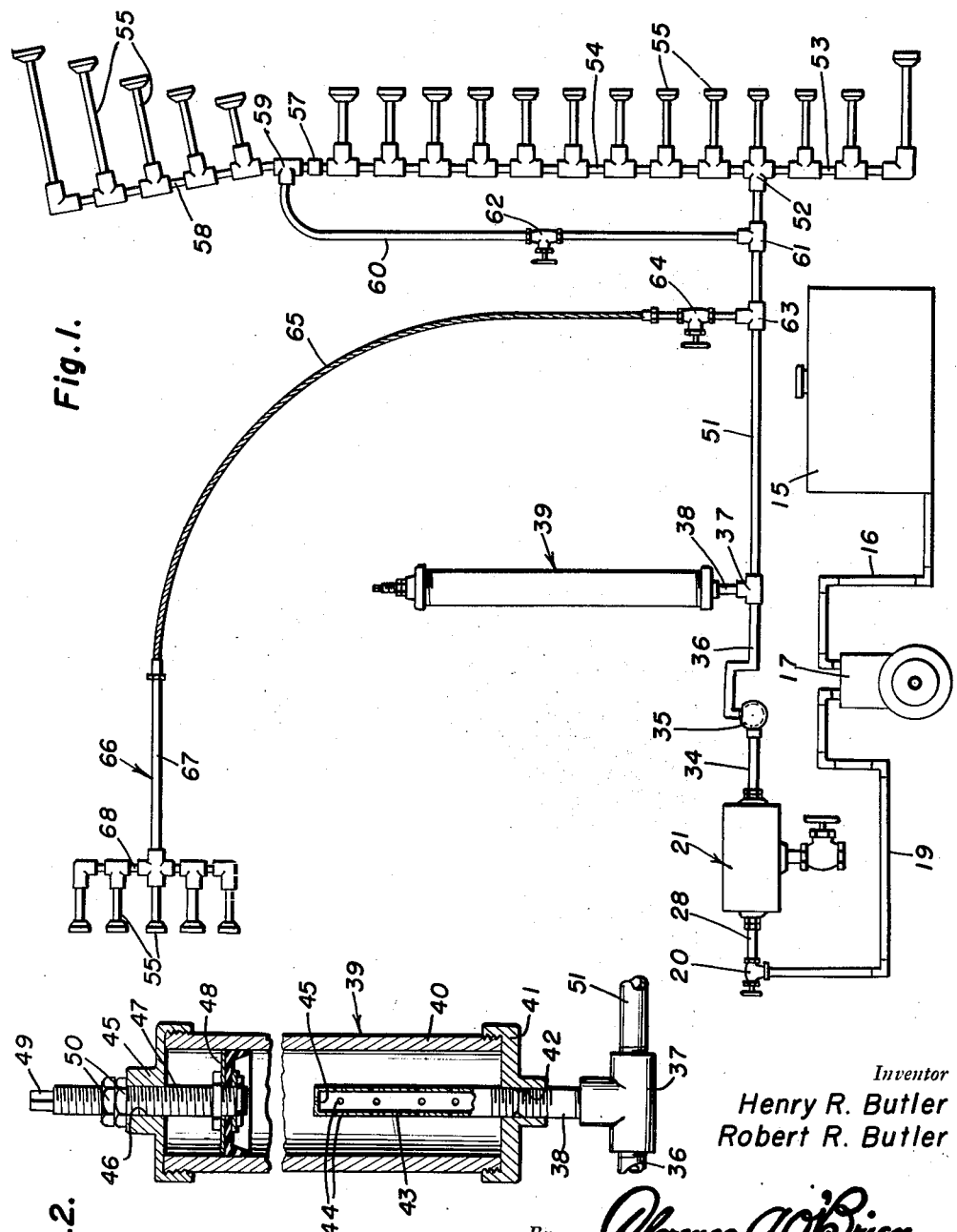

2,538,897

UNITED STATES PATENT OFFICE 2,538,897

PRESSURE ACCUMULATOR OR STABILIZER FOR USE WITH TREE SPRAYING APPARATUS

Henry R. Butler and Robert R. Butler, Winchester, Va., assignors to Shenandoah Equipment Company, Incorporated, Winchester, Va., a corporation of Virginia Application April 11, 1947, Serial No. 740,934

1 Claim. (Cl. 138—31)

This invention relates to tree culture and more particularly to apparatus for producing a cloud of tree treating vapor and directing it into a tree or group of trees through spray nozzles.

The primary object of the invention is to provide a pressure accumulator or resonance chamber comprising a cylinder, heads closing opposite ends of the cylinder, means coupling one end of the cylinder through a head with the system to permit fluid from the system to rise in the cylinder against air trapped in the cylinder, and means to increase or decrease the volume of the cylinder to regulate the size of the air chamber and cause the air entrapped therein to act against the fluid in the system to bring into resonance the vibrations induced in the fluid by the pump and the vibrations induced in the liquid by its issuance through the spray nozzles.

In the drawings:

Figure 1 is a diagrammatic view of a spray apparatus embodying the features of this invention; and Figure 2 is an enlarged vertical sectional view through the stabilizer or pressure accumulator.

The tree treating and vapor producing apparatus comprises a liquid storage tank 15 to which is coupled by a suitable discharge pipe 16 a conventional pump 17 driven by a conventional motor (not shown) mounted adjacent the rear end of a truck body (not shown).

Leading from the pressure side of the pump is a supply pipe 19 which is coupled through the medium of a control valve 20 and a suitable type nipple 28 to a strainer or filter designated generally 21.

Leading from the strainer or filter 21 is a horizontally extending angular leg or distributing pipe 34 to which a swivel coupling 35 of conventional form is connected. Attached to the swivel coupling for horizontal swinging movement about the vertical axis thereof is a swinging arm 36 which in effect forms a continuation of the distributing pipe 34, so that fluid pumped through the pipes 34 and the arm 36 may be directed toward one or toward the opposite side of the truck (not shown) according to the position of the arm 36.

Coupled to the free end of the swinging arm 36 is a T 37 the middle leg of which is directed upwardly and is attached by means of a nipple 38 to the improved stabilizer or pressure accumulator designated generally 39 which forms a major portion of this invention.

The stabilizer 39 above referred to comprises a cylinder 40 provided at its lower end with an enclosure cap 41 which is provided with an internally screw-threaded axial bore 42 into which the nipple 38 is threaded. Threaded into the bore 42 in alignment with the nipple 38 projecting up into the cylinder 40 axially thereof is a pipe nipple 43 provided with longitudinally spaced radial openings 44. The inner end of the nipple 43 is closed as at 45 and thus it will be seen that liquid rising through the nipple 38 and the nipple 43 will enter the cylinder 40 through the openings 44. A suitable cap 45 closes the upper end of the cylinder 40 and is provided with an axially disposed internally screw-threaded opening 46 for the reception of a threaded stem 47 carrying at its inner end a piston or plunger 48 which serves to seal off the upper end of the cylinder from the lower end thereof. The end of the threaded stem 47 opposite that carrying the plunger 48 is squared as at 49 to accommodate a wrench or the like, and encircling the stem immediately above the upper end of the threaded opening 46 are suitable lock nuts 50 by means of which the stem may be locked in adjusted position with relation to the cylinder. It will be thus seen that the volume of the cylinder may be varied by loosening the lock nuts 50 and turning the stem 47 to advance or retreat the piston or plunger 48.

Leading from the leg of the T 37 directly opposite the pipe 36 is a pipe 51 carrying at its extreme outer end a cross 52 into which is coupled vertically extending pipes 53 and 54 carrying a vertical row of spaced spray nozzles 55. Coupled by a suitable coupling 57 to the upper end of the pipe 53 is a second pipe or manifold 58 carrying adjacent its lower end a fitting 59 into which is coupled one end of a supply pipe 60, the opposite end of which is connected by a suitable fitting 61 to the pipe 51 previously referred to. A valve 62 is interposed between the opposite ends of the supply pipe 60 and extending outwardly from the manifold pipe 58 is a vertical row of spaced spray nozzles 55. It will thus be seen that by manipulating the valve 62 the spray nozzles carried by the manifold 58 may be selectively employed.

Coupled by a suitable fitting 63 to the pipe 51 is a control valve 64 to the discharge side of which is connected a flexible pipe 65 which in turn is connected to a brush spray designated generally 66. The brush spray above referred to comprises a pipe 67 forming a handle for its manipulation and also a conductor through which the fluid is conducted to a manifold 68 carrying a group of spray nozzles 55 which in all respects correspond to the spray nozzles previously discussed.

In use it will be understood that the truck body (not shown) is driven between the rows of trees or in an orchard and an operator riding grasping the brush spray 66 in his hands may spray the upper parts of the trees, while the lower parts of the trees are sprayed by the spray nozzles 55 in the manifolds 53 and 58. Due to the pivotal coupling of the leg 36 it is obvious that the manifolds may be swung about the vertical axis of the coupling 35 so that trees on both sides of the vehicle may be sprayed simply by swinging the manifolds from side to side.

The spray liquid issuing from the spray nozzles 55 is vaporized so that it floats as a cloud toward the trees under treatment, and the vaporization is achieved by adjusting the position of the plunger 48 within the cylinder 40. This is accomplished while the equipment is in operation by turning the stem 47 to advance or retract the plunger 48 until such time as the vibratory impulses induced in the liquid by the pump, and the vibrations induced in the liquid by its discharge through the spray nozzles are brought into resonance. Obviously once the system has been properly balanced the lock nuts 50 are tightened in order to hold the plunger 48 against accidental displacement. At the same time should the system for any reason get out of resonance it is a simple matter to loosen the lock nuts and with the apparatus in operation the position of the plunger 48 is again adjusted.

While in the foregoing there has been shown and described the preferred embodiment of this invention it is to be understood that minor changes in the details of construction, combination and arrangement of parts may be resorted to without departing from the spirit and scope of the invention as claimed.

We claim:

A stabilizer for a tree spraying system comprising a cylinder, a cap closing each end of the cylinder, a perforated liquid inlet nipple entering the cylinder through the cap at the lower end thereof, a piston rod threaded through the cap at the upper end of the cylinder and a piston on the end of the rod within the cylinder for varying the volumetric capacity of the cylinder when the rod is turned within the cap, and closure nuts received on said piston rod exteriorly of said upper cap to fixedly retain said piston in adjusted position within said cylinder.

HENRY R. BUTLER.
ROBERT R. BUTLER.

REFERENCES CITED

The following references are of record in the file of this patent:

UNITED STATES PATENTS

| Number | Name | Date |
| --- | --- | --- |
| 300,917 | Story | June 24, 1884 |
| 1,128,856 | Cornwall et al. | Feb. 16, 1915 |
| 1,883,479 | Bateman et al. | Oct. 18, 1932 |
| 1,959,640 | Peters | May 22, 1934 |
| 2,170,890 | Allen | Aug. 29, 1939 |
| 2,401,792 | Overbeke | June 11, 1946 |
| 2,432,309 | Gore | Dec. 9, 1947 |
| 2,457,834 | Ricketson | Jan. 4, 1949 |